United States Patent
Wu

(10) Patent No.: US 9,179,339 B2
(45) Date of Patent: Nov. 3, 2015

(54) METHOD AND SYSTEM FOR TESTING THE WIRELESS SIGNAL PROPAGATION MODEL OF THE CELLULAR NETWORK

(75) Inventor: Yanwei Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 831 days.

(21) Appl. No.: 12/919,006

(22) PCT Filed: Oct. 17, 2008

(86) PCT No.: PCT/CN2008/072746
§ 371 (c)(1),
(2), (4) Date: Nov. 1, 2010

(87) PCT Pub. No.: WO2009/111934
PCT Pub. Date: Sep. 17, 2009

(65) Prior Publication Data
US 2011/0039548 A1    Feb. 17, 2011

(30) Foreign Application Priority Data

Mar. 11, 2008    (CN) .......................... 2008 1 0007366

(51) Int. Cl.
*H04W 24/00*    (2009.01)
*H04W 24/06*    (2009.01)

(52) U.S. Cl.
CPC ..................................... *H04W 24/06* (2013.01)

(58) Field of Classification Search
CPC ..... H04W 56/00; H04W 24/00; H04W 24/02; H04W 24/06; H04W 12/02; H04W 24/04; H04W 24/08; H04W 28/0289; H04W 28/06; H04W 28/065; H04W 36/0066; H04W 52/0212; H04W 56/001; H04W 56/0035; H04W 60/00; H04W 72/0486; H04W 74/00

USPC ......................................................... 455/423
See application file for complete search history.

(56) References Cited

U.S. PATENT DOCUMENTS 5,831,974 A * 11/1998 Suonvieri ....................... 370/252
6,404,388 B1 * 6/2002 Sollenberger et al. ........ 342/387
6,571,082 B1    5/2003 Rahman et al.

FOREIGN PATENT DOCUMENTS

| CN | 1541001 | 10/2004 |
|---|---|---|
| CN | 1547340 | 11/2004 |

(Continued)

OTHER PUBLICATIONS

English Machine Translation of Chinese Application 200310112566.*

(Continued)

*Primary Examiner* — Mahendra Patel
*Assistant Examiner* — Natasha Cosme
(74) *Attorney, Agent, or Firm* — Knobbe, Martens, Olson & Bear, LLP

(57) ABSTRACT

A method and system for testing the wireless signal propagation model of the cellular network is provided in the invention. The method comprising: selecting a testing site to install a receiving testing apparatus; moving a transmission apparatus along a testing route transmitting a testing signal upon moving; the receiving testing apparatus receiving the testing signal, and detecting the strength of the received testing signal; and obtaining field strength testing data along the testing route based on a synchronization established between the transmission apparatus and the receiving testing apparatus. By this invention, the testing efficiency of the wireless signal propagation model correction in the area covered by the cellular network can be improved.

7 Claims, 6 Drawing Sheets

(56) References Cited

FOREIGN PATENT DOCUMENTS

| | | |
|---|---|---|
| CN | 101247613 | 8/2008 |
| JP | 7-162352 | 6/1995 |
| JP | 2002-141855 A | 5/2002 |
| JP | 2002-217843 A | 8/2002 |
| JP | 2006-93778 | 4/2006 |
| JP | 2006-093778 A | 4/2006 |
| JP | 2007-318609 A | 12/2007 |
| WO | 97/40547 | 10/1997 |

OTHER PUBLICATIONS

PCT; International Search Report for PCT/CN2008/072746; Feb. 5, 2009.

Patent Examination in Australian Patent Application No. 2008352847 issued Feb. 22, 2013 in 2 pages.

Patent Examination in Japanese Patent Application No. 2010-550016 in 2 pages.

Japanese Examination Report in Japanese Application No. 2010-550016 in 3 pages.

* cited by examiner

METHOD AND SYSTEM FOR TESTING THE WIRELESS SIGNAL PROPAGATION MODEL OF THE CELLULAR NETWORK

CROSS-REFERENCE TO RELATED APPLICATIONS

This application is the U.S. National Phase application under 35 U.S.C. §371 of International Application PCT/CN2008/072746 filed on Oct. 17, 2008, which claims priority to Chinese Application 200810007366.6 filed Mar. 11, 2008. The entirety of the two of these applications is hereby incorporated by reference.

TECHNICAL FIELD

The present invention relates to the communication field, and in particular, to a method and system for testing the wireless signal propagation model of the cellular network.

BACKGROUND OF THE INVENTION

Nowadays, the cellular networking is the commonest networking mode in the wireless communication. FIG. 1 is a topology structure of a cellular network constructed by three-sector base stations. Since the network topology structure looks like a honeycomb, it is called as cellular network. As shown in FIG. 1, the circles 1 represent the locations of the three-sector base stations, the arrowheads 2 show the orientation of each of the sectors, and each hexagonal cellular unit 3 in the cellular network denotes the coverage range, known as cell, of the transceiver of one base station. In the coverage area of the cell, a terminal can establish a wireless communication link with the base station. Multiple transceivers form a network to continually cover an area so as to provide user terminals with a seamless wireless communication service.

FIG. 2 is the flow of the traditional network planning. As shown in FIG. 2, the wireless network planning is begun with the user requirements 202, including the designed capacity, coverage range and coverage rate, network performance KPI index. When the designed requirement is clear, it comes to the requirement analysis 204 of the wireless network design, including the prediction of the coverage radius of the coverage area and the analysis of the distribution of the user capacity. The capacity distribution of the coverage area means to determine the equipment configuration and the size of the coverage radius of the cell according to the potential of the user development in the network coverage area. The original design 206 of the network topology structure is completed on the map by combining the two factors, i.e., the network coverage and the user distribution.

Based on the original design of the network topology structure, the process of selecting the appropriate base station sites in the actual coverage environment is called site survey 208. During the site survey, the engineering survey may be performed at the same time to discuss with the owners about the matters concerned such as site rental. Due to various factors, the practically available sites are not necessarily identical with the designed sites. But after the site survey, it is basically ascertained which sites possess the essential conditions for establishing the base stations. Therefore, after the sites are selected, it is necessary to use the network simulation 210 to verify whether the network design requirement is satisfied 212. If the design requirement is satisfied, the network design is output and it comes to the network engineering construction stage 214; otherwise, adjust the site parameters on the simulation platform to find the appropriate site places, antenna heights, and etc., and return to the sites to survey more appropriate sites. The wireless signal propagation model used by the network simulation can be the standard statistic model in the industry, and the corrected model can also be used.

Based on the wireless signal propagation model, the typical propagation model for the traditional cell coverage prediction includes Hata, Cost231 and etc. In order to improve the accuracy of the cell coverage prediction, the propagation model is usually needed to be corrected for typical topographic and geomorphologic environment.

The model correction can be performed at any place before step 210 as shown in the flow of FIG. 2, and its working procedure is as shown in FIG. 3:

Step 302, selecting 3-5 typical areas in a certain urban environment, and choosing typical sites. One or more typical sites can be selected.

Step 304, erecting the continuous wave transmitter at a typical site height for transmission at a fixed power. The vehicular continuous wave receiver moves in the typical area to measure the receiving field strength.

Step 306, collecting sufficient testing data (the data of multiple testing sites with similar topography and geomorphology may be merged, the quantity of one-time testing data may also be increased for the area, and etc.).

Step 308, performing a preprocess for the testing data, including averaging the testing data on the repeated route, eliminating the data too near to or too far from the testing site, merging the testing data of multiple testing sites in the typical areas of a single type, and etc.

Step 310, modifying the parameters of the propagation model using the model correction tool, so as to make its predicted coverage even closer to the actual wireless propagation model of the typical coverage area of this type.

Step 312, forming a model database for the wireless propagation models of several typical areas for the usage of the wireless network simulation.

The traditional method of the propagation model correction corrects the wireless propagation model by collecting sufficient field strength testing data through selecting the typical sites with respect to the typical topography and geomorphology (multiple testing sites are usually needed to be selected such that the testing data covers various topography, geomorphology and site heights).

For the sake of improving the model accuracy, the more the testing sites are selected, the more sufficient the testing data is collected, the better the model correction effect is (multiple parameters in the model are corrected and the parameters corresponding to various geomorphology are corrected).

When testing the wireless signal field strength, transmission apparatus need to be installed in sequence at each testing site in the testing area, and the receiving field strength of the wireless signal is tested for the coverage area of each site in sequence. If n sites are to be tested, the apparatus installation and the testing need to be performed n times, which results in quite large workload.

SUMMARY OF THE INVENTION

For the problem of the heavy workload caused by repeated installing the transmission apparatus and testing the receiving field strength at each testing site in the testing area in the prior art, the objective of the present invention is to provide a method and system for testing the wireless propagation model to solve the above problem.

According to one aspect of the invention, a method for testing the wireless signal propagation model correction of a cellular network is provided. The method comprises the following steps: selecting a testing site to install a receiving testing apparatus; moving a transmission apparatus along a testing route, transmitting a testing signal upon moving; and the receiving testing apparatus receiving the testing signal and detecting the strength of the receiving signal; obtaining field strength testing data along the testing route according to a synchronization established between the transmission apparatus and the receiving testing apparatus.

According to another aspect of the invention, a system for testing the wireless signal field strength of the cellular network is further provided. The system comprises: a transmission apparatus, configured to move along a testing route, transmitting the testing signal upon moving; and a receiving testing apparatus, configured to be installed at a selected testing site to receive the testing signal and to detect the strengths of the receiving signal, and to obtain the field strength testing data along the testing route based on the synchronization established between the transmission apparatus and the receiving testing apparatus.

In the present invention, the testing of multiple sites is completed at one time through transmitting the testing signal by the transmission apparatus when it moves along the testing route and installing the receiving testing apparatuses at all testing sites, which overcomes the problem of the heavy workload in the prior art caused by installing the transmission testing apparatus in sequence at each testing site in the testing area and then repeated testing the field strength of the receiving signal for each site, which further improves the field strength testing efficiency.

DESCRIPTION OF THE DRAWINGS

The drawings herein provide a further understanding to the present invention and constitute a part of the application. The exemplary embodiments of the present invention and the description thereof are used to explain the present invention, and do not unduly limit the present invention. In the drawings.

DETAILED DESCRIPTION

Summary of Functionality

For the problem of the heavy workload caused by repeated installing the transmission apparatus and testing the receiving field strength at each testing site in the testing area in the prior art, in the technical solutions provided by the embodiments of the present invention, the problem of the heavy workload is overcome by completing the testing of multiple sites at one time through transmitting the testing signal by the transmission apparatus when it moves along the testing route and installing the receiving testing apparatuses at all testing sites, which improves the field strength testing efficiency.

Hereinafter, the present invention is described in detail by referring to the figures in combination of the embodiments.

Figure 1:
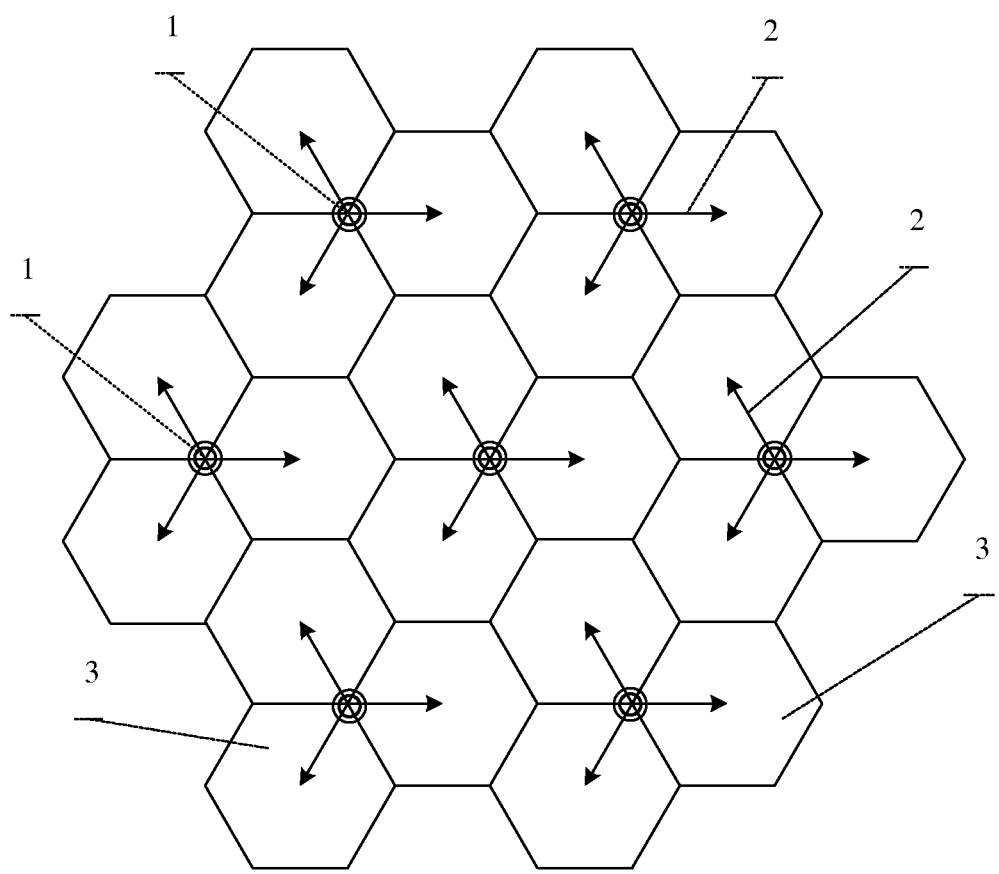
FIG. 1 shows a schematic diagram of the cellular wireless communication network of the related art.
Figure 2:
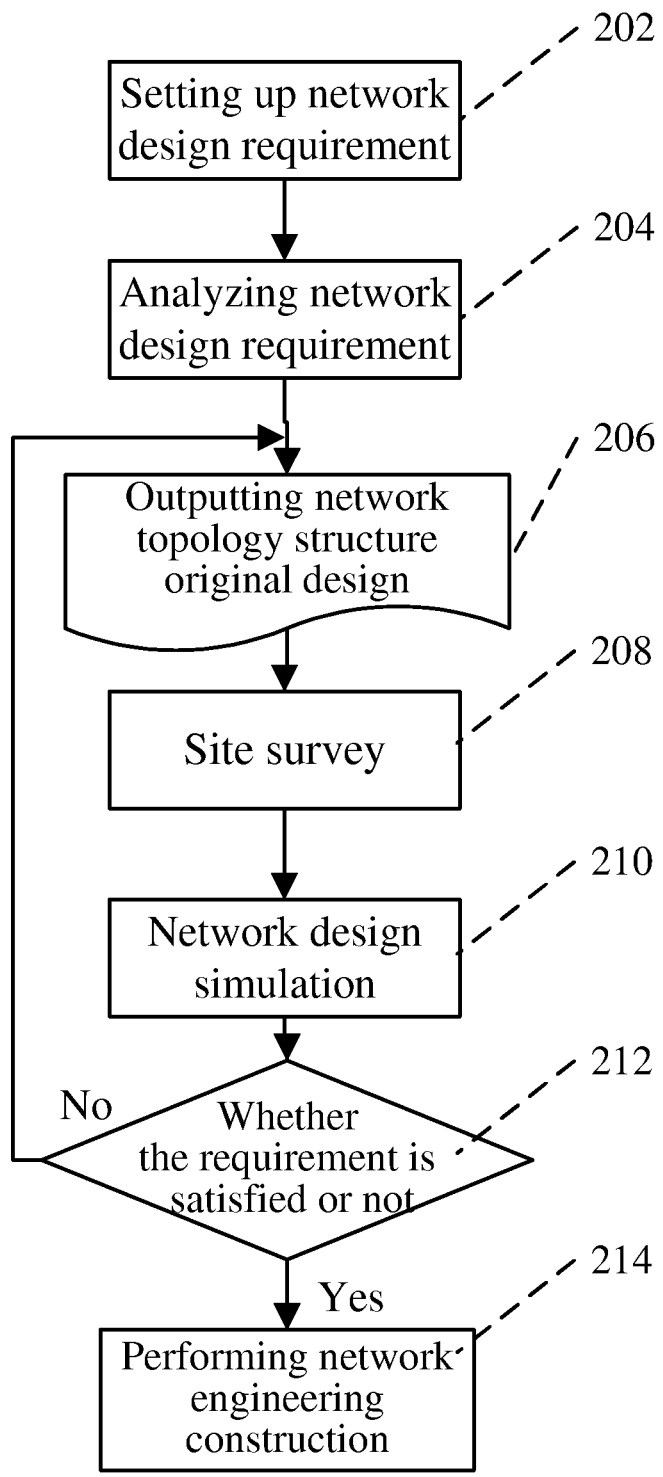
FIG. 2 shows a flow chart of the traditional wireless network planning of the related art.
Figure 3:
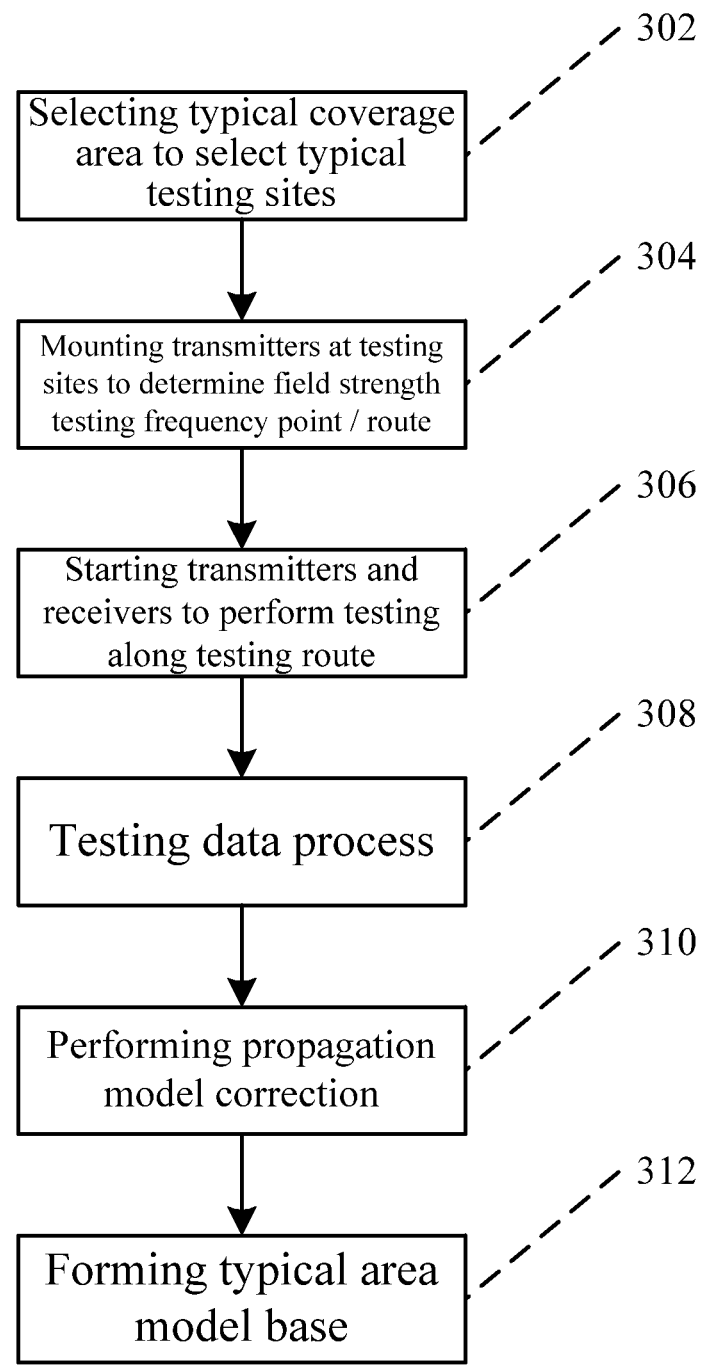
FIG. 3 shows a flow chart of the traditional propagation model correction of the related art.
Figure 4:
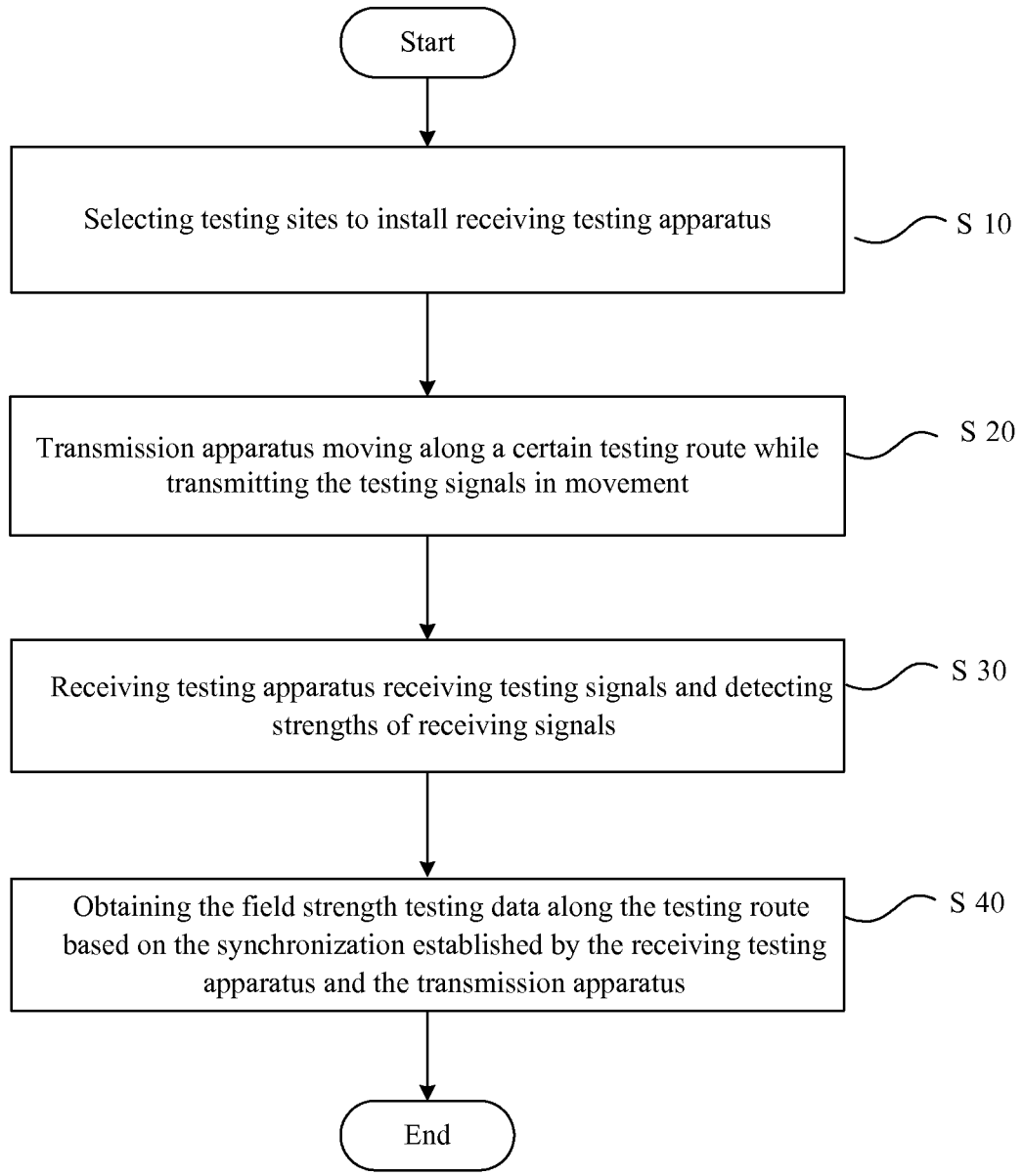
FIG. 4 shows a flow chart of the method for testing the wireless signal propagation model of the cellular network according to an embodiment of the present invention.

FIG. 4 shows a flow chart of the method for testing the wireless signal propagation model of the cellular network according to an embodiment of the present invention, including the following steps:

Step S10, selecting a testing site to install a receiving testing apparatus;

Step S20, moving a transmission apparatus along a testing route, transmitting a testing signal;

Step S30, the receiving testing apparatus receiving the testing signal, and detecting the strengths of the receiving signal; and Step S40, obtaining the field strength testing data along the testing route based on the synchronization established between the transmission apparatus and the receiving testing apparatus.

In the method for testing the wireless signal propagation model of the cellular network in the above embodiment, the testing of a plurality of sites is completed at one time through transmitting the testing signal by the transmission apparatus when it moves along the testing route and installing the receiving testing apparatuses at all testing sites, which overcomes the problem of the heavy workload in the prior art caused by installing the transmission testing apparatus in sequence at each testing site in the testing area and repeated testing the field strength of the receiving signal for each site, which further improves the field strength testing efficiency.

Usually, the transmission apparatus can be installed in a vehicle, such that the transmission apparatus can easily move along the testing route while transmitting the signal at the same time.

Preferably, Step S10 specifically includes: selecting multiple testing sites in one or more types of areas, and selecting the typical heights in the multiple testing sites to install the receiving testing apparatus. Each testing site can be installed with one or more receiving testing apparatuses that are respectively oriented to one or more directions.

The principle of selecting the typical sites, generally known by the person skilled in the art, includes enabling the testing route to cover various geographical objects, topographies and possible antenna heights and etc. as much as possible. The preferable embodiment above, by selecting various types of areas and installing the receiving testing apparatuses oriented to multiple directions at typical heights in multiple testing sites, can enable the receiving apparatus to better receive the testing signal, which avoids the unfavorable influence to the testing accuracy due to the complex environment on site.

Preferably, there is not merely one transmission apparatus in Step S20. The movement of the multiple transmission apparatuses simultaneously along the testing route can effectively shorten the testing time and improve the testing efficiency.

Preferably, Step S30 further includes: multiple receiving testing apparatuses simultaneously detecting the testing signal and testing the receiving signal field strength.

Preferably, Step S40 further includes: selectively merging the field strength testing data according to the time synchronization established between the transmission apparatus and the receiving testing apparatus, and the topographic and geomorphologic characters along the testing route; and performing the wireless propagation model correction according to the field strength testing data, and forming the wireless propagation model under at least one type of environment.

In the preferable embodiment above, by selectively merging the field strength testing data to correct the wireless propagation model, the relative typical testing data in the testing area can be better used, and further the accuracy of the wireless propagation model correction is improved.

Figure 5:
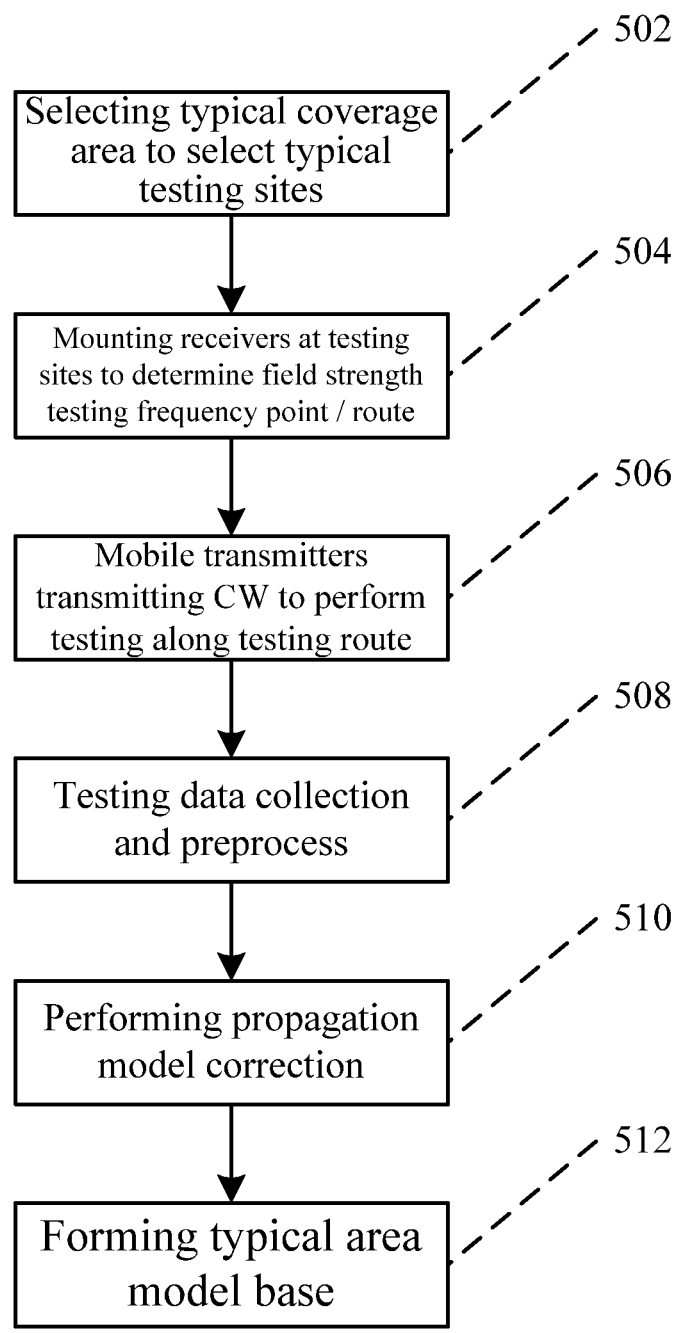
FIG. 5 shows a flow chart of the method for testing the wireless signal propagation model of the cellular network according to a preferable embodiment of the present invention.

FIG. 5 shows a flow chart of the method for testing the wireless signal propagation model of the cellular network according to a preferable embodiment of the present invention, specifically including:

Step 502, for a certain urban environment, choosing 3-5 typical areas, such as dense urban area, common urban area, suburb, open ground. There are various similar but not completely unified definitions to the topography and geomorphology in the typical area, which results in different understandings to the definitions of the topographic characters of the same type. The present invention will not focus on the planning simulation deviation and model correction introduced by the ambiguity of the definition to the typical area. In Step 502, multiple typical sites are selected in each typical area. The principle of selecting the typical sites, generally known by the person skilled in the art, includes enabling the testing route to cover various geographical objects, topographies and possible antenna heights and etc. as much as possible.

Step 504, erecting the Continuous Wave ("CW" for short) receivers (CW receiver) at the typical sites and the selectable heights. The CW receiver includes a GPS receiving module therein. The vehicular CW transmitters (CW transmitter) move in the typical area according to the set route for transmitting at a fixed power and a set frequency point. The CW transmitter includes a GPS receiving module therein. All the CW receivers measure the receiving field strength, and record the measuring time. It is not limited to one CW transmitter. The CW transmitters record the transmitting time and the location information on the testing route while transmitting the testing signals. In particular, different frequency points can be set to distinguish the multiple transmitters to perform the testing in parallel in different areas that are overlapped to a certain extent; and the areas that are not overlapped with each other also can be divided to make the different CW transmitters use the same frequency to accomplish the testing in different areas, and etc.

Step 506, a mobile transmitter transmitting the CW to perform the testing according to the testing route.

Step 508, collecting the testing data and the location information and time of the transmitters at all testing sites to determine the mapping relation between the testing data and the testing route according to the synchronous time. Perform a preprocess for the classified testing data, including averaging the testing data on the repeated routes to eliminate the data too near to or too far from the testing sites, merging the testing data of multiple testing sites in the typical areas of a single type, and etc.

Step 510, correcting the parameters of the propagation model using the model correction tool to make the predicted coverage even closer to the coverage area of the typical practical wireless propagation model.

Step 512, inputting the wireless propagation models of several typical areas into a model database for the wireless network simulation usage.

The present embodiment is only an embodiment according to the method of the present invention. The method of the present invention also can be accomplished by various alterations. For instance, the signal transmitted by the mobile transmitter is not only limited to the CW signal, it also can be pseudo-random code spread-spectrum signal, and etc. For another example, the present embodiment uses a GPS system to provide the synchronous time, and the synchronization between the transmitter and the receiver also can be established by other manners, the related technology of which is generally known in the industry. All the similar alterations belong to the scope of protection of the present invention.

Figure 6:
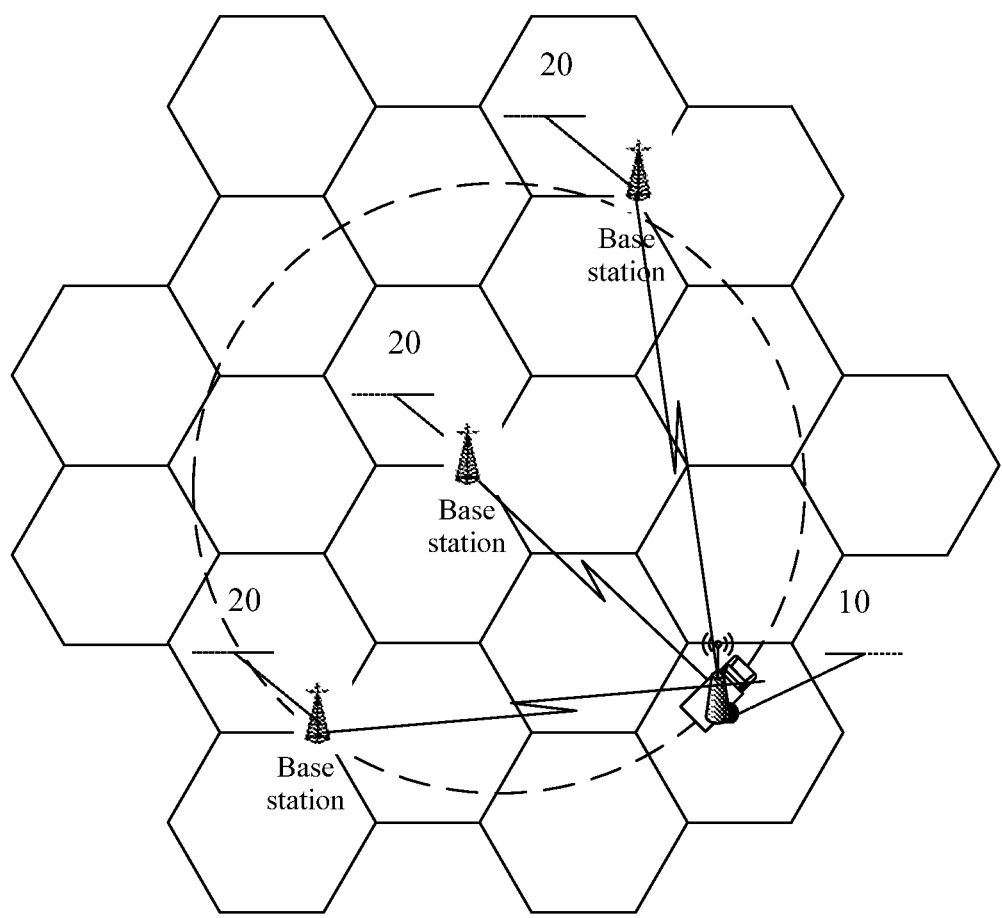
FIG. 6 shows a schematic diagram of the system for testing the wireless signal field strength of the cellular network according to an embodiment of the present invention.

FIG. 6 shows a schematic diagram of the system for testing the wireless signal field strength of the cellular network according to an embodiment of the present invention, including:

a transmitting apparatus 10, configured to move along a testing route, and to transmit the testing signals while moving; and a receiving testing apparatus 20, installed at a selected testing site configured to receive the testing signal and to detect the strengths of the receiving signals, and to obtain the field strength testing data along the testing route according to the synchronous time established between the transmitter and the receiver.

In the system for testing the wireless signal field strength of the cellular network according to the above embodiment, the testing of a plurality of sites is completed at one time through transmitting the testing signals by the transmission apparatus when it moves along the testing route and installing the receiving testing apparatuses at all testing sites, which overcomes the problem of the heavy workload in the prior art caused by installing the transmission testing apparatus in sequence at each testing site in the testing area and repeated testing the field strength of the receiving signal for each site, which further improves the field strength testing efficiency.

Preferably, the receiving testing apparatus includes: a receiving module, configured to receive the testing signal; a testing module, configured to test the strengths of the receiving signal; and a clock synchronizing module, configured to establish the time synchronization with the transmission apparatus. For example, the clock synchronizing module can be a GPS receiving module, configured to obtain the synchronous time.

Preferably, it is not only limited to one transmission apparatus. The transmission apparatus includes: a transmitting module, configured to transmit the testing signal; a clock synchronizing module, configured to establish the clock synchronization with the receiving testing apparatus; a locating module, configured to record the location information of the testing route. For example, the clock synchronizing module can be a GPS module, configured to obtain the synchronous time, and to record the location information of the testing route. The simultaneous movements of the multiple transmission apparatuses along the testing route can effectively shorten the testing time and improve the testing efficiency.

Preferably, the receiving testing apparatus can comprise one or more receiving testing apparatuses, which are installed at typical heights at the multiple testing sites selected from one or more types of areas, and respectively oriented to one or more directions. The preferable embodiment above, by selecting various types of areas and installing the receiving testing apparatuses oriented to multiple directions at the typical heights in the multiple testing sites, can make the receiving apparatuses better receive the testing signals, which avoids the unfavorable influence to the testing accuracy due to the complex environment on site.

Preferably, the above testing system for the wireless signal field strength further includes model analyzing apparatus, configured to analyze the field strength testing data to obtain the wireless propagation model about the area of the testing route, which comprising: a merging module, configured to selectively merge the field strength testing data according to the topographic and geomorphologic characters along the testing route; and a correcting module, configured to perform the wireless propagation model correction using the field strength testing data to form the wireless propagation models under one or more types of environment.

In the preferable embodiment above, the relative typical testing data in the testing area can be better used by the model analysis apparatus, and further the accuracy of the wireless propagation model correction is improved.

In the method and system for testing the wireless signal propagation model of the cellular network in the above embodiment of the present invention, the testing of a plurality of sites is completed at one time through transmitting the testing signal by the transmission apparatus when it moves along the testing route and installing the receiving testing apparatuses at all testing sites, which overcomes the problem of the heavy workload in the prior art caused by installing the transmission testing apparatus in sequence at each testing site in the testing area and repeated testing the field strength of the receiving signal for each site, which further improves the field strength testing efficiency.

Apparently, the person skilled in the art should know that each of the modules or steps in the present invention can be realized by the general calculating apparatus, which can be collected in a single calculating apparatus or distributed on the network formed by a plurality of calculating apparatus. Selectively, they can be realized by the program codes executable by the calculating apparatus, therefore, they can be stored in the storing apparatus to be executed by the calculating apparatus, or they can be realized by fabricating them into integrated circuit modules, respectively, or a plurality of modules or steps therein are fabricated into individual integrated circuit module for accomplishment. Thus, the present invention is not limited to the combination of any particular hardware and software.

The descriptions above are only preferable embodiments of the present invention, which are not used to restrict the present invention. For the person skilled in the art, the present invention may have various changes and variations. Any amendments, equivalent substitutions, improvements etc. within the spirit and principle of the present invention should be concluded in the scope protected by the present invention.

The invention claimed is:

1. A method for testing wireless signal propagation model of a cellular network, comprising:
   selecting more than one testing sites to install a receiving testing apparatus,
   wherein selecting more than one testing sites to install the receiving testing apparatus comprises selecting at least one height in each of the testing sites to mount at least one said receiving testing apparatus, the at least one receiving testing apparatus being respectively oriented in at least one direction;
   moving a transmission apparatus along a testing route, transmitting a testing signal upon moving; the receiving testing apparatus receiving the testing signal, and detecting the strength of the received testing signal; and
   obtaining field strength testing data along the testing route based on a synchronization established between the transmission apparatus and the receiving testing apparatus; and
   analyzing the field strength testing data to obtain a wireless propagation model about an area of the testing route, the analyzing comprising:
   selectively merging the field strength testing data according to a topographic and geomorphologic feature along the testing route; and
   performing a wireless propagation model correction using the field strength testing data to form the wireless propagation model under at least one type of environment.

2. The method for testing wireless signal propagation model according to claim 1, wherein selecting more than one testing sites to install a receiving testing apparatus comprises:
   selecting at least one testing site in at least one type of area.

3. The method for testing wireless signal propagation model according to claim 1, wherein at least one transmission apparatus is included.

4. A system for testing wireless signal field strength of a cellular network, comprising:
   a transmitting apparatus, configured to transmit a testing signal upon moving along a testing route;
   a receiving testing apparatus, installed at more than one selected testing sites, configured to receive the testing signal and to detect the strength of the received signal; and to obtain field strength testing data along the testing route according to a synchronization established between the transmission apparatus and the receiving testing apparatus, wherein the more than one selected testing sites to install the receiving testing apparatus comprise at least one height selected in each of the testing sites to mount at least one said receiving testing apparatus, the at least one receiving testing apparatus being respectively oriented in at least one direction; and
   a model analyzing apparatus, configured to analyze the field strength testing data to obtain a wireless propagation model about an area of the testing route, the model analyzing apparatus comprising:
   a merging module, configured to selectively merge the field strength testing data according to a topographic and geomorphologic feature along the testing route; and
   a correcting module, configured to perform a wireless propagation model correction using the field strength testing data to form the wireless propagation model under at least one type of environment.

5. The system for testing wireless signal field strength according to claim 4, wherein the receiving testing apparatus comprises:
   a receiving module, configured to receive the testing signal;
   a testing module, configured to test the strength of the received testing signal; and
   a clock synchronizing module, configured to establish a synchronization with the transmission apparatus.

6. The system for testing wireless signal field strength according to claim 4, wherein the receiving testing apparatus comprises at least one said receiving testing apparatus mounted at the at least one height in the at least one testing site selected from at least one type of area and is respectively oriented in the at least one direction.

7. The system for testing wireless signal field strength according to claim 4, wherein at least one transmission apparatus is included, the transmission apparatus comprises:
   a transmitting module, configured to transmit the testing signal upon moving;
   a clock synchronizing module, configured to establish a clock synchronization with the receiving testing apparatus;
   a locating module, configured to record the location information of the testing route.

* * * * *